(12) United States Patent
Voigt

(10) Patent No.: US 7,299,385 B2
(45) Date of Patent: Nov. 20, 2007

(54) MANAGING A FAULT TOLERANT SYSTEM

(75) Inventor: Douglas L. Voigt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 10/900,948

(22) Filed: Jul. 28, 2004

(65) Prior Publication Data

US 2006/0026451 A1 Feb. 2, 2006

(51) Int. Cl.
G06F 11/00 (2006.01)

(52) U.S. Cl. .................................................. 714/57
(58) Field of Classification Search ................... 714/57
See application file for complete search history.

(56) References Cited

U.S. PATENT DOCUMENTS

| | | | |
|---|---|---|---|
| 5,408,218 A | * | 4/1995 | Svedberg et al. ........... 340/507 |
| 6,006,016 A | * | 12/1999 | Faigon et al. ................. 714/48 |
| 6,874,099 B1 | * | 3/2005 | Balasubramanian et al. ... 714/4 |
| 7,035,953 B2 | * | 4/2006 | Krontz et al. ............... 710/302 |
| 2003/0061322 A1 | * | 3/2003 | Igarashi et al. ............. 709/223 |
| 2003/0097588 A1 | * | 5/2003 | Fischman et al. ........... 713/200 |
| 2004/0236547 A1 | * | 11/2004 | Rappaport et al. ............. 703/2 |
| 2005/0137832 A1 | * | 6/2005 | Yemini et al. .............. 702/183 |
| 2005/0185597 A1 | * | 8/2005 | Le et al. ..................... 370/254 |
| 2005/0198583 A1 | * | 9/2005 | Martinez et al. ............ 715/772 |
| 2005/0210330 A1 | * | 9/2005 | Platteter ...................... 714/25 |
| 2005/0232256 A1 | * | 10/2005 | White et al. ................ 370/360 |
| 2006/0106585 A1 | * | 5/2006 | Brown et al. .................. 703/1 |

* cited by examiner

Primary Examiner—Bryce P Bonzo

(57) ABSTRACT

Systems and methods for managing a fault tolerant system are disclosed. In one implementation a system for managing a fault tolerant system comprises a configuration manager that receives configuration events from the fault tolerant system, a fault normalizer that receives fault events from the fault tolerant system; and a fault tolerance logic engine that constructs a model of the fault tolerant system based on inputs from the configuration manager and generates reporting events in response to inputs from the fault normalizer.

26 Claims, 14 Drawing Sheets

MANAGING A FAULT TOLERANT SYSTEM

TECHNICAL FIELD

The described subject matter relates to electronic computing, and more particularly to managing a fault tolerant system.

BACKGROUND

A disk array is a type of turnkey, high-availability system. A disk array is designed to be inherently fault tolerant with little or no configuration effort. It responds automatically to faults, repair actions, and configuration in a manner that preserves system availability. These characteristics disk arrays are achieved by encoding fault recovery and configuration change responses into embedded software, i.e., firmware that executes on the array controller. This encoding is often specific to the physical packaging of the array.

Since the software embedded in disk arrays is complex and expensive to develop, it is desirable to foster as much reuse as possible across an array product portfolio. Different scales of systems targeted at various market segments have distinct ways of integrating of the components that make up the system.

For example, some array controllers and disks are distributed in a single package with shared power supplies, while other array controllers are packaged separately from disks, and each controller has its own power supply. In the future, turnkey, fault tolerant systems may include loosely-integrated storage networking elements. The patterns of redundancy and common mode failure differ across these integration styles. Unfortunately these differences directly affect the logic that governs fault and configuration change responses.

Therefore, there remains a need for systems and methods for managing a fault tolerant system.

SUMMARY

In one exemplary implementation a system for modeling and managing a fault tolerant system, comprises a configuration manager that receives configuration events from the fault tolerant system; a fault normalizer that receives fault events from the fault tolerant system; and a fault tolerance logic engine that constructs a model of the fault tolerant system based on inputs from the configuration manager and generates reporting events in response to inputs from the fault normalizer.

DETAILED DESCRIPTION

Described herein are exemplary architectures and techniques for managing a fault-tolerant system. The methods described herein may be embodied as logic instructions on a computer-readable medium, firmware, or as dedicated circuitry. When executed on a processor, the logic instructions (or firmware) cause a processor to be programmed as a special-purpose machine that implements the described methods. The processor, when configured by the logic instructions (or firmware) to execute the methods recited herein, constitutes structure for performing the described methods.

Exemplary Architecture

Figure 1:
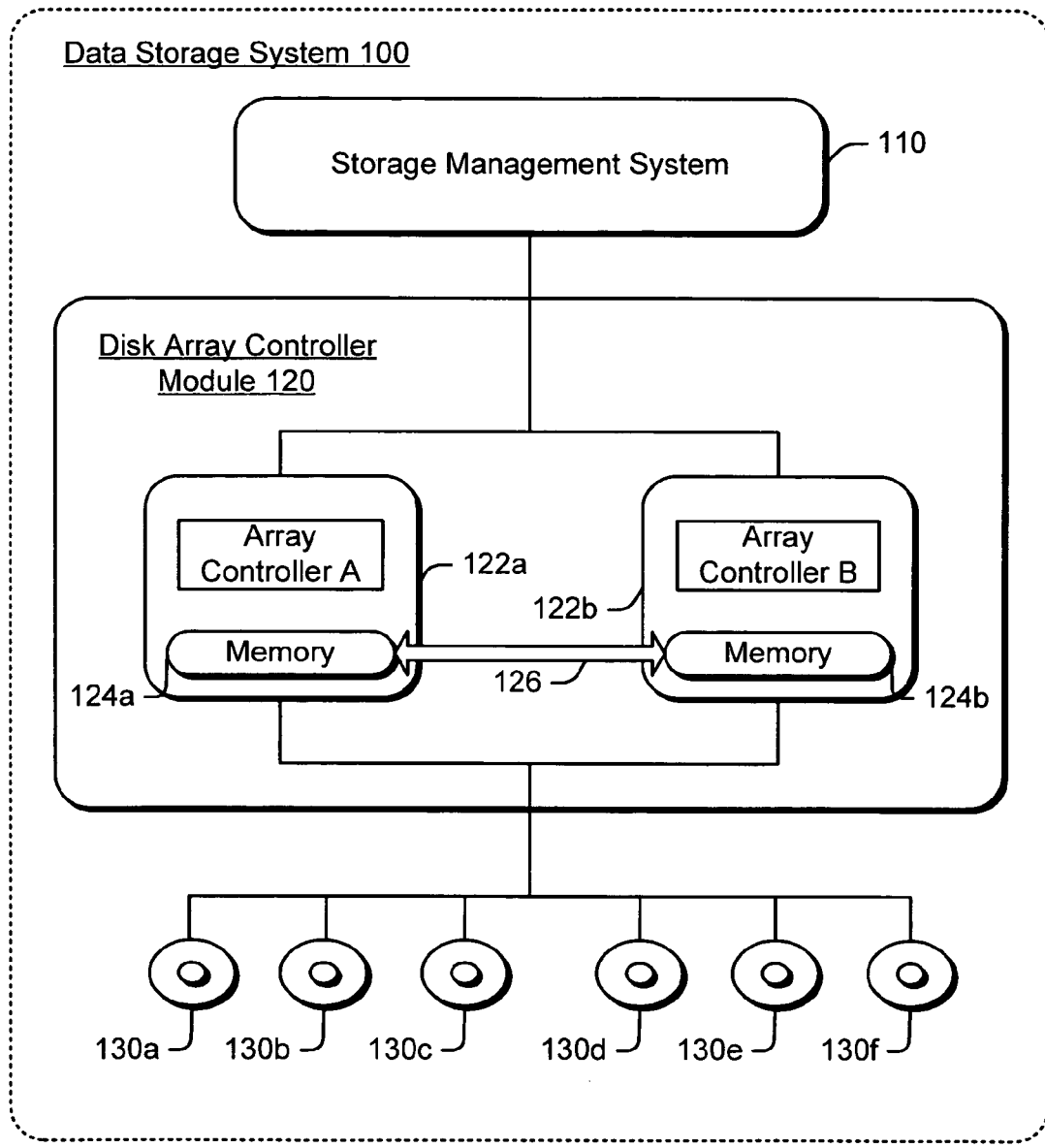
FIG. 1 is a schematic illustration of an exemplary implementation of a data storage system.

FIG. 1 is a schematic illustration of an exemplary implementation of a data storage system 100. The data storage system 100 has a disk array with multiple storage disks 130*a*-130*f*, a disk array controller module 120, and a storage management system 110. The disk array controller module 120 is coupled to multiple storage disks 130*a*-130*f* via one or more interface buses, such as a small computer system interface (SCSI) bus. The storage management system 110 is coupled to the disk array controller module 120 via one or more interface buses. It is noted that the storage management system 110 can be embodied as a separate component (as shown), or within the disk array controller module 120, or within a host computer.

In an exemplary implementation data storage system 100 may implement RAID (Redundant Array of Independent Disks) data storage techniques. RAID storage systems are disk array systems in which part of the physical storage capacity is used to store redundant data. RAID systems are typically characterized as one of six architectures, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirror redundancy. Original data is stored on one set of disks and a duplicate copy of the data is kept on separate disks. The RAID 2 through RAID 5 architectures involve parity-type redundant storage. Of particular interest, a RAID 5 system distributes data and parity information across a plurality of the disks 130*a*-130*c*. Typically, the disks are divided into equally sized address areas referred to as "blocks". A set of blocks from each disk that have the same unit address ranges are referred to as "stripes". In RAID 5, each stripe has N blocks of data and one parity block which contains redundant information for the data in the N blocks.

In RAID 5, the parity block is cycled across different disks from stripe-to-stripe. For example, in a RAID 5 system having five disks, the parity block for the first stripe might be on the fifth disk; the parity block for the second stripe might be on the fourth disk; the parity block for the third stripe might be on the third disk; and so on. The parity block for succeeding stripes typically rotates around the disk drives in a helical pattern (although other patterns are possible). RAID 2 through RAID 4 architectures differ from RAID 5 in how they compute and place the parity block on the disks. The particular RAID class implemented is not important.

In a RAID implementation, the storage management system 110 optionally may be implemented as a RAID management software module that runs on a processing unit of the data storage device, or on the processor unit of a computer 130.

The disk array controller module 120 coordinates data transfer to and from the multiple storage disks 130a-130f. In an exemplary implementation, the disk array module 120 has two identical controllers or controller boards: a first disk array controller 122a and a second disk array controller 122b. Parallel controllers enhance reliability by providing continuous backup and redundancy in the event that one controller becomes inoperable. Parallel controllers 122a and 122b have respective mirrored memories 124a and 124b. The mirrored memories 124a and 124b may be implemented as battery-backed, non-volatile RAMs (e.g., NVRAMs). Although only dual controllers 122a and 122b are shown and discussed generally herein, aspects of this invention can be extended to other multi-controller configurations where more than two controllers are employed.

The mirrored memories 124a and 124b store several types of information. The mirrored memories 124a and 124b maintain duplicate copies of a cohesive memory map of the storage space in multiple storage disks 130a-130f. This memory map tracks where data and redundancy information are stored on the disks, and where available free space is located. The view of the mirrored memories is consistent across the hot-plug interface, appearing the same to external processes seeking to read or write data.

The mirrored memories 124a and 124b also maintain a read cache that holds data being read from the multiple storage disks 130a-130f. Every read request is shared between the controllers. The mirrored memories 124a and 124b further maintain two duplicate copies of a write cache. Each write cache temporarily stores data before it is written out to the multiple storage disks 130a-130f.

The controller's mirrored memories 122a and 122b are physically coupled via a hot-plug interface 126. Generally, the controllers 122a and 122b monitor data transfers between them to ensure that data is accurately transferred and that transaction ordering is preserved (e.g., read/write ordering).

Figure 2:
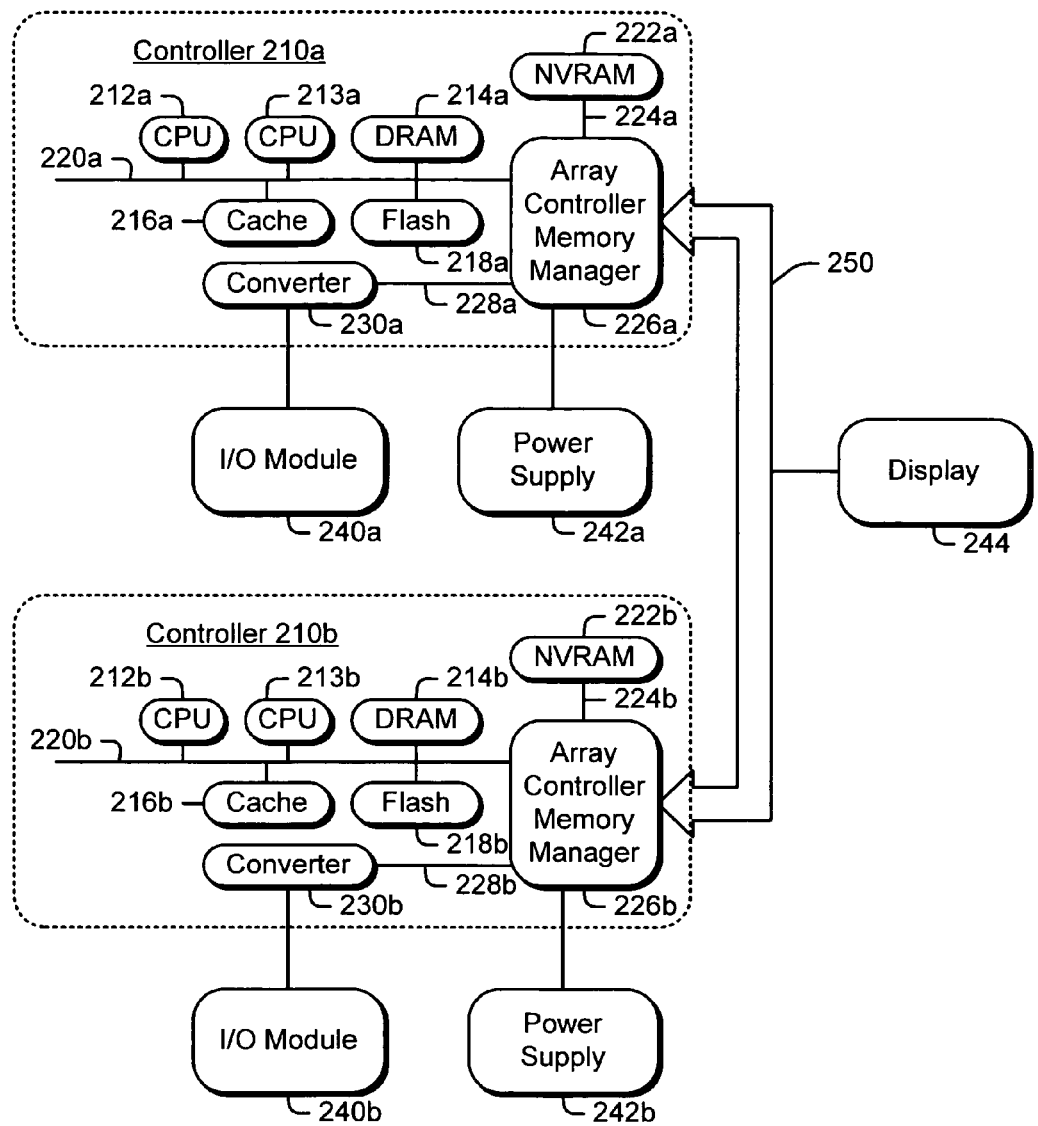
FIG. 2 is a schematic illustration of an exemplary implementation of a disk array controller in more detail.

FIG. 2 is a schematic illustration of an exemplary implementation of a dual disk array controller in greater detail. In addition to controller boards 210a and 210b, the disk array controller also has two I/O modules 240a and 240b, an optional display 244, and two power supplies 242a and 242b. The I/O modules 240a and 240b facilitate data transfer between respective controllers 210a and 210b and a host computer. In one implementation, the I/O modules 240a and 240b employ fiber channel technology, although other bus technologies may be used. The power supplies 242a and 242b provide power to the other components in the respective disk array controllers 210a, 210b, the display 272, and the I/O modules 240a, 240b.

Each controller 210a, 210b has a converter 230a, 230b connected to receive signals from the host via respective I/O modules 240a, 240b. Each converter 230a and 230b converts the signals from one bus format (e.g., Fibre Channel) to another bus format (e.g., peripheral component interconnect (PCI)). A first PCI bus 228a, 228b carries the signals to an array controller memory transaction manager 226a, 226b, which handles all mirrored memory transaction traffic to and from the NVRAM 222a, 222b in the mirrored controller. The array controller memory transaction manager maintains the memory map, computes parity, and facilitates cross-communication with the other controller. The array controller memory transaction manager 226a, 226b is preferably implemented as an integrated circuit (IC), such as an application-specific integrated circuit (ASIC).

The array controller memory transaction manager 226a, 226b is coupled to the NVRAM 222a, 222b via a high-speed bus 222a, 222b and to other processing and memory components via a second PCI bus 220a, 220b. Controllers 210a, 210b may include several types of memory connected to the PCI bus 220a and 220b. The memory includes a dynamic RAM (DRAM) 214a, 214b, flash memory 218a, 218b, and cache 216a, 216b.

The array controller memory transaction managers 226a and 226b are coupled to one another via a communication interface 250. The communication interface 250 supports bi-directional parallel communication between the two array controller memory transaction managers 226a and 226b at a data transfer rate commensurate with the NVRAM buses 224a and 224b.

The array controller memory transaction managers 226a and 226b employ a high-level packet protocol to exchange transactions in packets over hot-plug interface 250. The array controller memory transaction managers 226a and 226b perform error correction on the packets to ensure that the data is correctly transferred between the controllers.

The array controller memory transaction managers 226a and 226b provide a memory image that is coherent across the hot plug interface 250. The managers 226a and 226b also provide an ordering mechanism to support an ordered interface that ensures proper sequencing of memory transactions.

In an exemplary implementation each controller 210a, 210b includes multiple central processing units (CPUs) 212a, 213a, 212b, 213b, also referred to as processors. The processors on each controller may be assigned specific functionality to manage. For example, a first set of processing units 212a, 212b may manage storage operations for the plurality of disks 130a-130f, while a second set of processing units 213a, 213b may manage networking operations with host computers or software modules that request storage services from data storage system 100.

Figure 3:
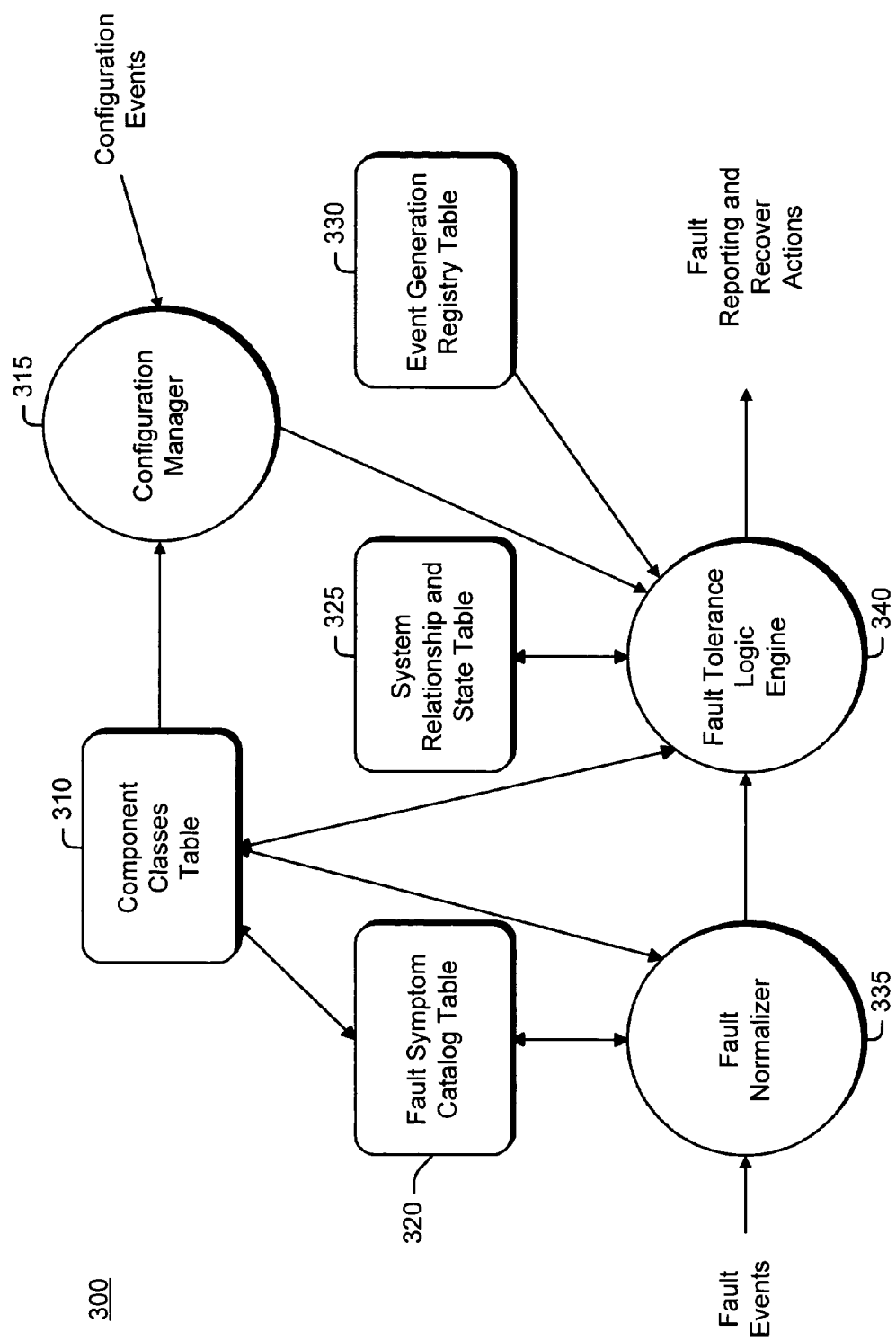
FIG. 3 is a schematic illustration of an exemplary fault tolerance system.

FIG. 3 is a schematic illustration of an exemplary fault tolerance system 300. In one exemplary implementation the fault tolerance system 300 depicted in FIG. 3 may be implemented in a storage controller such as, e.g., the storage controller depicted in FIG. 2. Fault tolerance system 300 comprises a series of active components including a configuration manager 315, a fault normalizer 335, and a fault tolerance logic engine 340. These active components may be implemented as logic instructions implemented in software executable on a processor, such as one of the CPUs 212a, 212b in the storage controller depicted in FIG. 2. Alternatively, the logic instructions may be implemented in firmware, or may be reduced to hardware in a controller. These active components create and/or interact with a series of storage tables including a component class table 310, a fault symptom catalog table 320, a system relationship and state table 325, and an event generation registry table 330. These tables may be implemented in one or more of the memory modules depicted in FIG. 2, or in an external memory location such as, e.g., a disk drive.

When fault tolerance system 300 is implemented in a data storage system such as the system depicted in FIG. 1, components of the data storage system such as power supplies, controllers, disks and switches are represented as a set of object-oriented classes, which are stored in the component classes table 310. In an exemplary implementation the component classes table 310 may be constructed by the manufacturer or administrator of the data storage system.

The fault symptom catalog table 320 is a data table that provides a mapping between failure information for specific components and fault events in the context of a larger data storage system. In an exemplary implementation the fault symptom catalog table 320 may be constructed by the manufacturer or administrator of the data storage system.

The event generation registry table 330 is a data table that maps reporting events for particular fault events or configuration change events to particular modules/devices in the data storage system. By way of example, a disk array in a storage system that utilizes the services of a power supply may register with the event generation registry table to receive notification of a failure event for the power supply.

As the data storage system is constructed (or modified) the configuration manager 315 and the fault tolerance logic engine 340 cooperate to build a system relationship and state table 325 that describes relationships between components in the data storage system. In operation, fault events and configuration change events are delivered to the fault tolerance logic engine 340, which uses the system relationship and state table 325 to generate fault reporting and recovery action events. The fault recovery logic engine 340 uses the mapping information in the event generation registry table 330 to propagate the reporting and recovery action events generated by the fault recovery logic engine 340 to other modules/devices in the storage system.

Operation of the system 300 will be described with reference to the flowcharts of FIGS. 5A through FIG. 7, and the graph depicted in FIG. 4.

Exemplary Operations

In operation, fault tolerance system 300 constructs an abstract model representative of a real, physical fault tolerant system such as, e.g., a storage system. The abstract model is configured with relationships and properties representative of the real fault tolerant system. Then the fault tolerance system 300 monitors operation of real fault tolerant system for changes in the status of the real fault tolerant system. The abstract model is updated to reflect changes in the status of one or more components of the real fault tolerant system.

More particularly, the configuration manager 315 receives configuration events (e.g., when the real system is powered on or when a new component is added to the system) and translates information about the construction of the real fault tolerant system and its components into a description usable by the fault tolerance logic engine 340. In an exemplary implementation configuration events may be formatted in a manner specific to the component that generates the configuration event. Accordingly, the configuration manager 315 associates a hardware-specific event with a component class in the component classes table 310 to translate the configuration event from a hardware-specific code into a code that is compatible with the model developed by system 300. The fault tolerance logic engine receives configuration information form the configuration manager 315 and constructs a model of the real physical system. In an exemplary implementation the real physical system may be implemented as a storage system and the model may depict the system as a graph.

Figure 4:
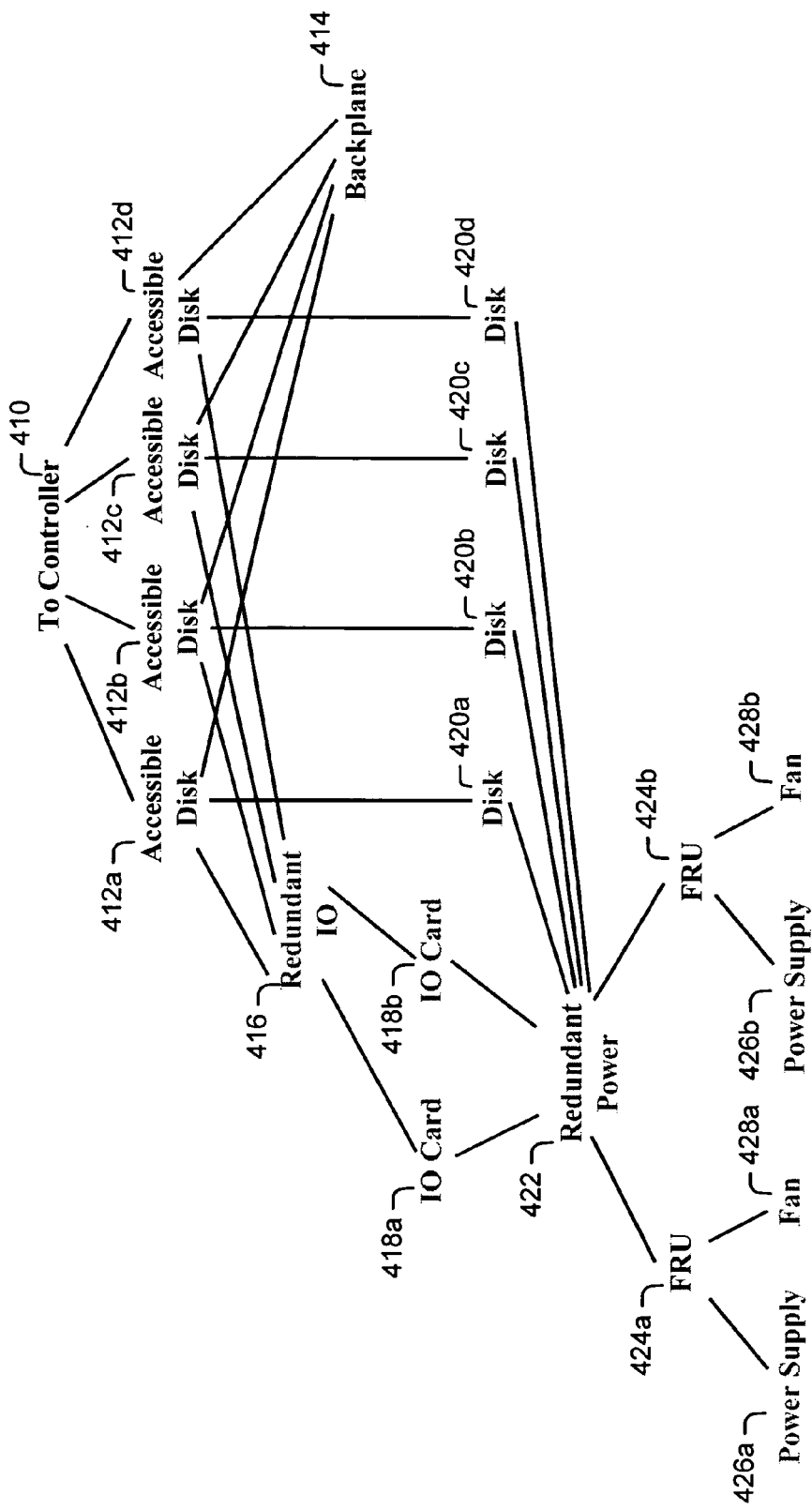
FIG. 4 is a schematic illustration of a graph representing components of a data storage system.

FIG. 4 is a graph illustrating a model of an exemplary storage system. Referring to FIG. 4, an exemplary storage system 400 may comprise a plurality of accessible disks units 412a-412d, each of which is connected to a controller 410. Each accessible disk unit 412a-412d may include on or more physical disks 420a-420d. Disk units 412a-412d may be connected to a common backplane 414 and to a redundant I/O unit 416, which may comprise redundant I/O cards 418a, 418b. The disks 420a-420d and the redundant I/O cards 418a, 418b may be connected to a redundant power unit 422, which comprises two field replaceable units (FRUs) 424a, 424b. Each FRU comprises a power supply 426a, 426b and a fan 428a, 428b.

By way of overview, in one exemplary implementation, the following configuration modification process is implemented using the configuration manager 315. First, an object is created for each primitive physical component in the real physical system by informing the fault tolerance logic engine 340 of the existence of the component, its name, its state and other parametric information that may be interpretable either by the fault tolerance logic engine 340 or by recipients of outbound events. Each of these objects is likely to represent a field replaceable unit such as a power supply, fan, PC board, or storage device.

Second, a dependency group is created for each set of primitive devices that depend on each other for continued operation. A dependency group is a logical association between a group (or groups) of components in which all of the components must be functioning correctly in order for the group to perform its collective function. For example, an array controller with its own non-redundant power supply and fan would represent a dependency group.

Third, a redundancy group is created for each set of components or groups that exhibits some degree of fault tolerant behavior. Redundancy parameters of the group may be set to represent the group's behavior within the bounds of a common fault tolerance relationship.

Fourth, additional layers of dependency and redundancy groups are created to represent the topology, construction and fault tolerance behavior of the entire system. This may be done by creating groups for whole rack mountable components that comprise a system, followed by additional layers indicating how those components are integrated into the particular system.

Fifth track component additions, deletions and other system modifications by destroying groups and creating others. Each time a group is created or destroyed, the state of all other components whose membership has changed as a result of the new configuration is recomputed. This is implemented by querying the states of all of the constituent components in the group after the change and combining them according to the type (dependency vs. redundancy) and parameters of the group. Any internal state changes that result are propagated throughout the system model within the apparatus.

These operations are described in greater detail in connection with the following text and the accompanying flowcharts.

FIGS. 5A-5D are flowcharts illustrating operations in an exemplary configuration process in a fault tolerance system. In an exemplary implementation the configuration process is invoked when a system is powered-up, so that the various components and groups in a system report their existence to the configuration manager 315. In addition, the configuration process is invoked when components (or groups) are added to or deleted from the system. The configuration manager processes the configuration events and forwards the configuration information to the fault tolerance logic engine 340, which invokes the operations of FIGS. 5A-5D to configure the model in the system relationship and state table 325 in accordance with the configuration events received by the configuration manager 315.

Figure 5A:
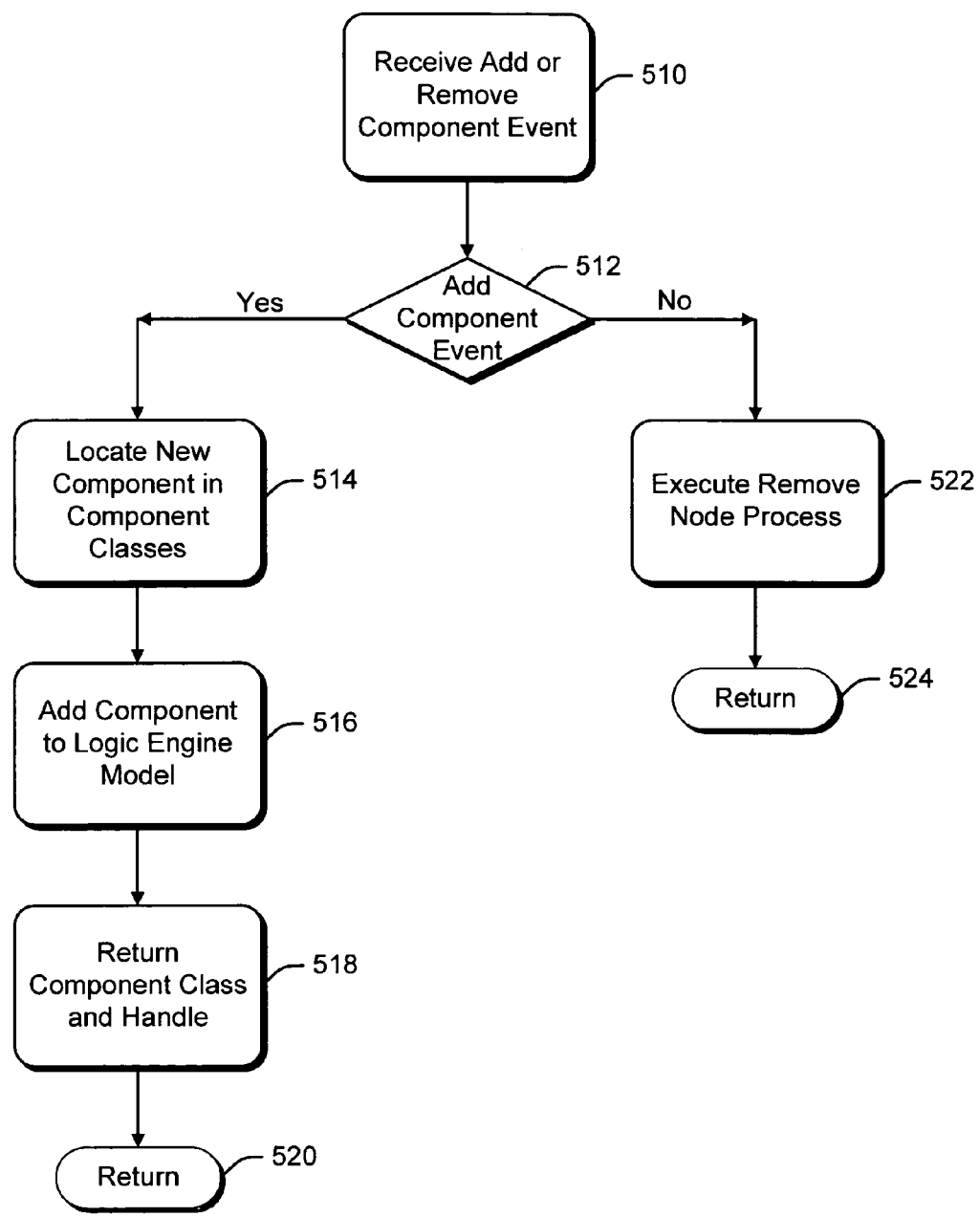
FIGS. 5A-5D are flowcharts illustrating operations in an exemplary process for configuring a fault tolerance system.

The operations of FIG. 5A are triggered when an add component event or a remove component event is received (operation 510) by the fault tolerance logic engine 340. For example, when a new component is added to the storage system the configuration manager 315 collects information about the new component and forwards an add component event to the fault tolerance logic engine 340. Similarly, when a component is removed, the removal is detected by the configuration manager 315, which forwards a remove component event to the fault tolerance logic engine 340.

Referring to FIG. 5A, at operation 512 if the event is an add component event, then control passes to operation 514 and the new component is located in the component classes table 310. At operation 516 the component is added to the model constructed by the fault tolerance logic engine 340. In an exemplary implementation the component is assigned a handle, i.e., an identifier by which the component may be referenced in the model. The component is then entered in the system relationship and state table 325. At operation 518 the component class and handle are returned for future reference, and at operation 520 control returns to the calling routine.

By contrast, if at operation 512 the event is not an add component event (i.e., if the event is a remove component event), then control passes to operation 522 and the remove node process is executed to remove a component node from the model constructed by the fault tolerance logic engine 340. The remove node process is described in detail below with reference to FIG. 6. At operation 524, control is returned to the calling routine.

Figure 5B:
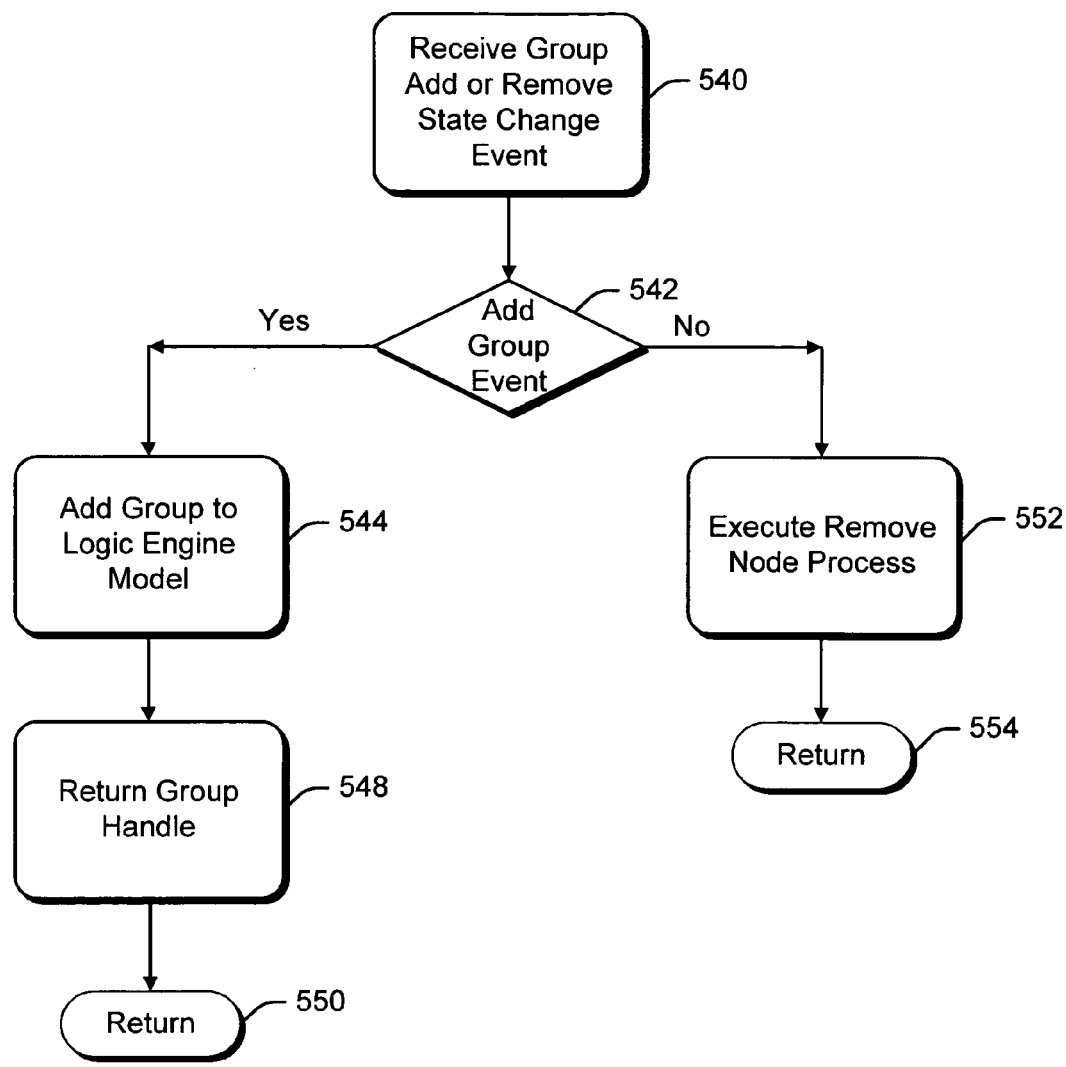

The operations of FIG. 5B are triggered when an add group event or a remove group event is received (operation 540) by the fault tolerance logic engine 340. For example, when a new group of components is added to the storage system the configuration manager 315 collects information about the new group of components and forwards an add group event to the fault tolerance logic engine 340. Similarly, when a group of components is removed, the removal is detected by the configuration manager 315, which forwards a remove group event to the fault tolerance logic engine 340.

Referring to FIG. 5B, at operation 542 if the event is an add group event, then control passes to operation 544 and the new group is created within the model constructed by the fault tolerance logic engine 340. In an exemplary implementation the group is assigned a handle, i.e., an identifier by which the group may be referenced in the model, at operation 546. At operation 5480 control returns to the calling routine.

By contrast, if at operation 542 the event is not an add group event (i.e., if the event is a remove group event), then control passes to operation 552 and the remove node process is executed to remove the group from the model constructed by the fault tolerance logic engine 340. The remove node process is described in detail below with reference to FIG. 6. At operation 554 control is returned to the calling routine.

Figure 5C:
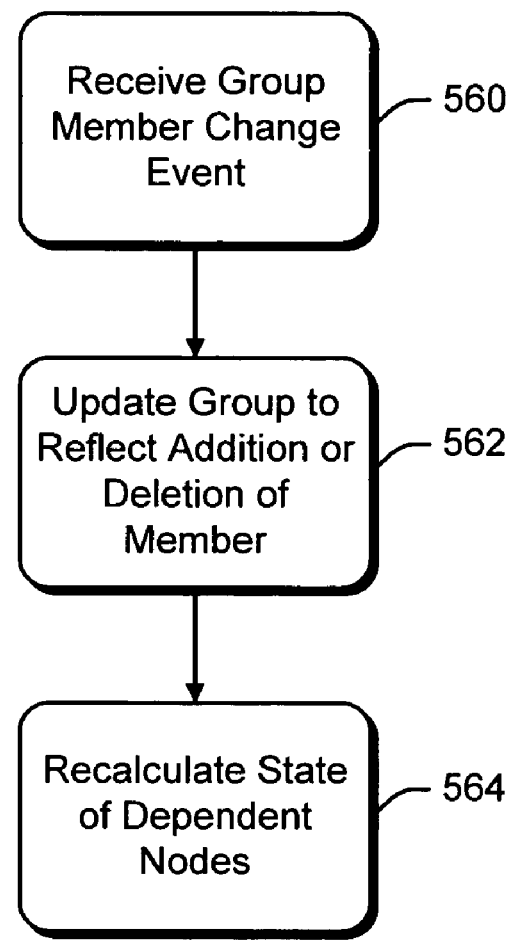

The operations of FIG. 5C are triggered when a group member change event is received, at operation 560. For example, when a component is added to or deleted from a group of components the configuration manager 315 collects information about the newly added or removed component and forwards an add member event or a remove member event to the fault tolerance logic engine 340. For the purpose of adding or deleting group members, a group of components may be treated as a component. In other words, group members may be single components or groups of components. At operation 562 the group is updated to reflect the addition or deletion of a member. At operation 564 a process is invoked to recalculate the state of any dependent nodes. This process is described in detail below with reference to FIGS. 7A-7C. Thus, the graph represented in FIG. 4 may be constructed by a repetitive process of discovering components as illustrated in FIG. 5A, creating components as illustrated in FIG. 5B, and adding components as illustrated in FIGS. 5C.

Figure 5D:
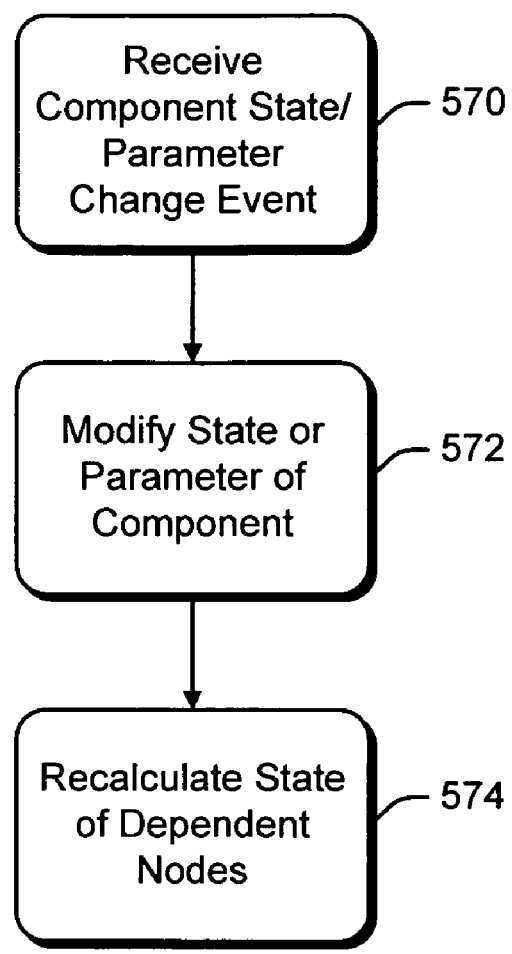

The operations of FIG. 5D are triggered when a component state change (e.g., a component failure) or a parameter change (e.g., a change in a failure threshold) event is received, at operation 570. For example, if the state of a component changes from active to inactive the configuration manager 315 collects the state change information and forwards a state change event to the fault tolerance logic engine 340. At operation 572 the state information (or parameter) is modified to reflect the reported change. At operation 574 a process is invoked to recalculate the state of any dependent nodes. This process is described in detail below with reference to FIGS. 7A-7C.

Figure 6:
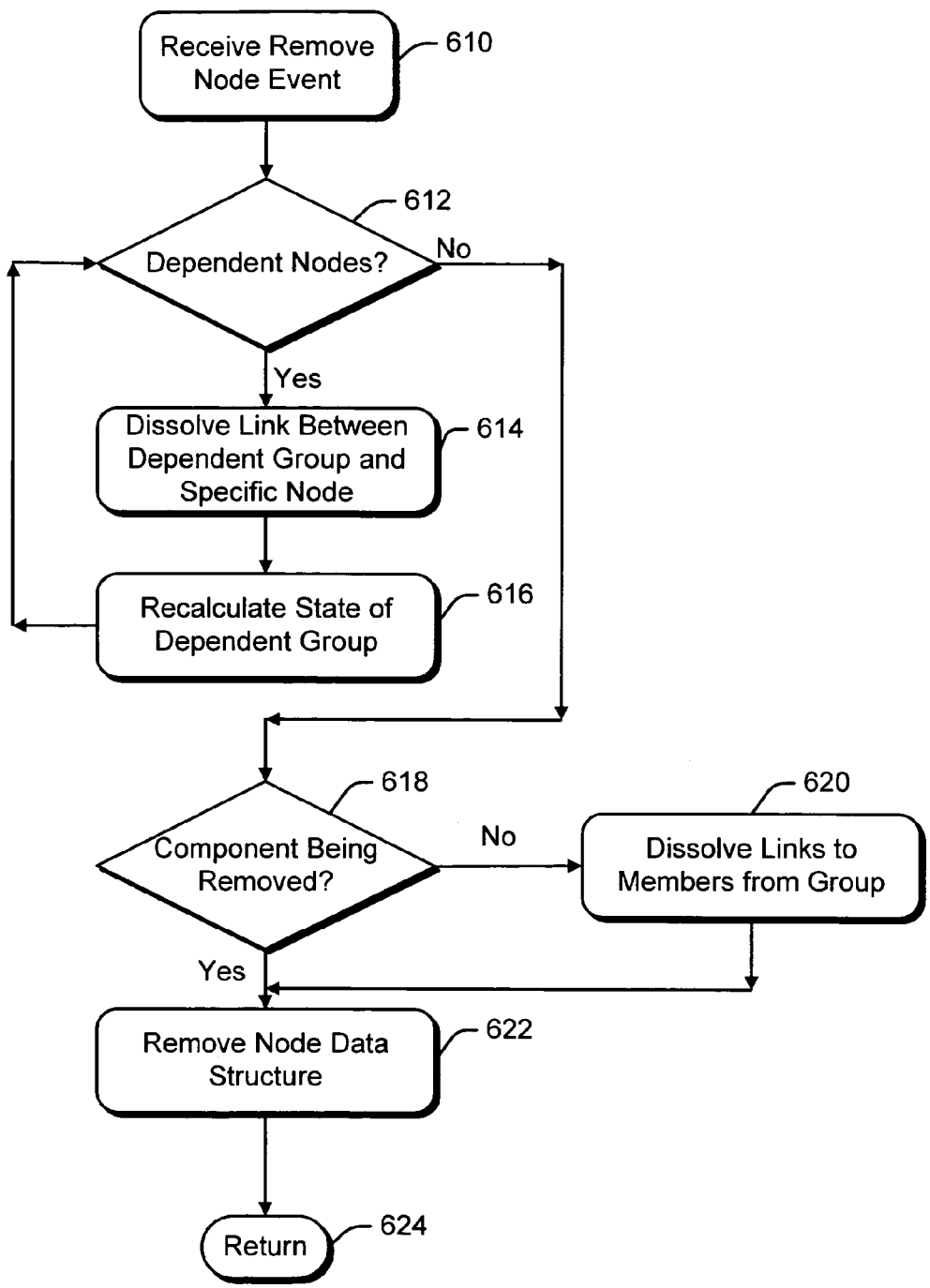
FIG. 6 is a flowchart illustrating operations in an exemplary process for deleting a node from a system model.

FIG. 6 is a flowchart illustrating operations in an exemplary process for deleting a node from a system model. Referring to FIG. 6, at operation 610 a delete node event is received, e.g., as a result of being invoked by operation 522. The process is invoked with a specific node. The delete node process implements a loop, represented by operations 612-616, in which the logical association between all nodes dependent on the specific node is dissolved and the state of the dependent group is recalculated. Thus, if at operation 616 the specific node has one or more dependent nodes, the control passes to operation 614 and the link between the dependent group and the specific node is dissolved. At operation 616 the state of each dependent group is recalculated. This process is described in greater detail below with reference to FIGS. 7A-7C.

Control then passes back to operation 612 and operations 612-616 are repeated until there are no more dependent nodes, whereupon control passes to operation 618. If, at operation 618, the specific node is a component, then control passes to operation 622 and the component node data structure is deleted. By contrast, if the specific node is not a component node (i.e., it is a group node) then control passes to operation 620 and the logical links between the group and its constituent members are dissolved. Control then passes to operation 622, and the specific group node data structure is deleted. At operation 624 control returns to the calling routine.

Figure 7A:
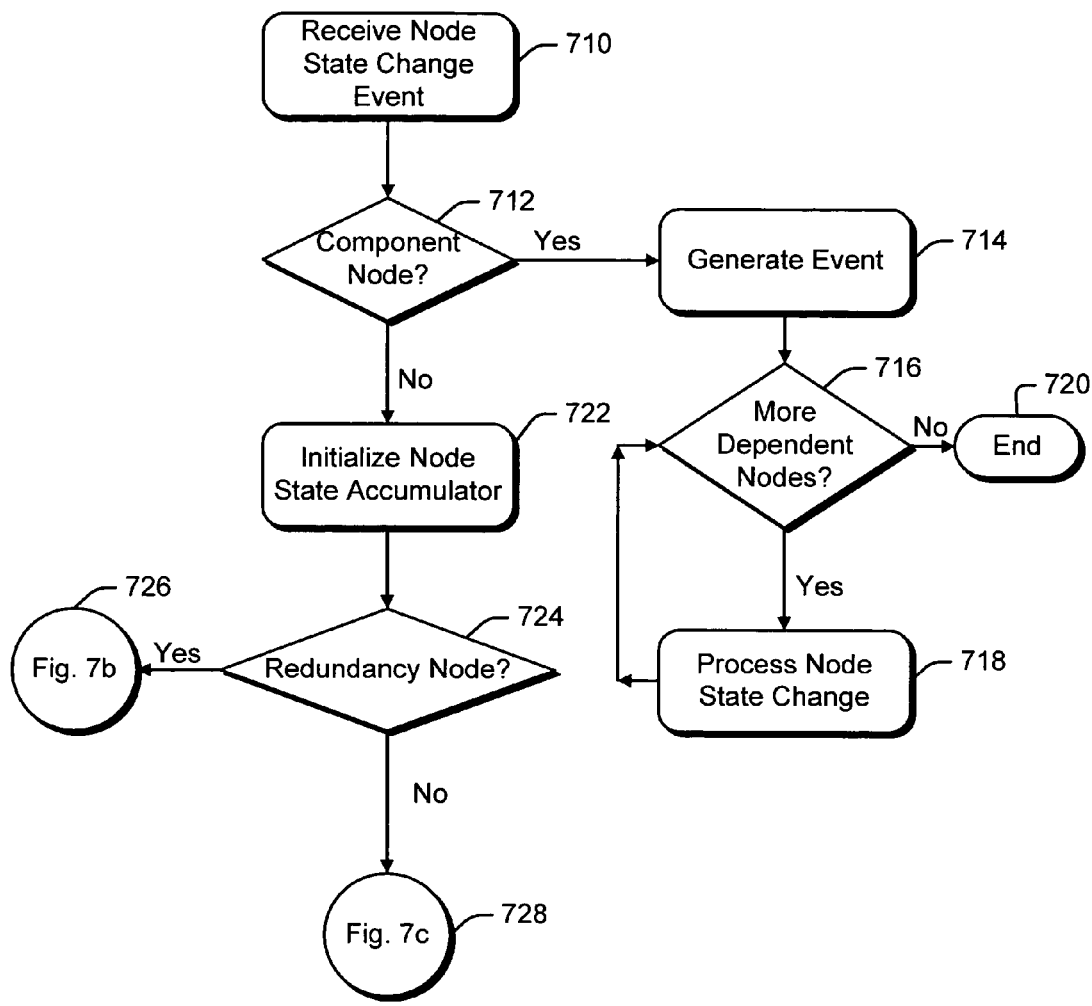
FIGS. 7A-7C are flowcharts illustrating operations in an exemplary process for recalculating the state of one or more system nodes in a fault tolerance system.
Figure 7B:
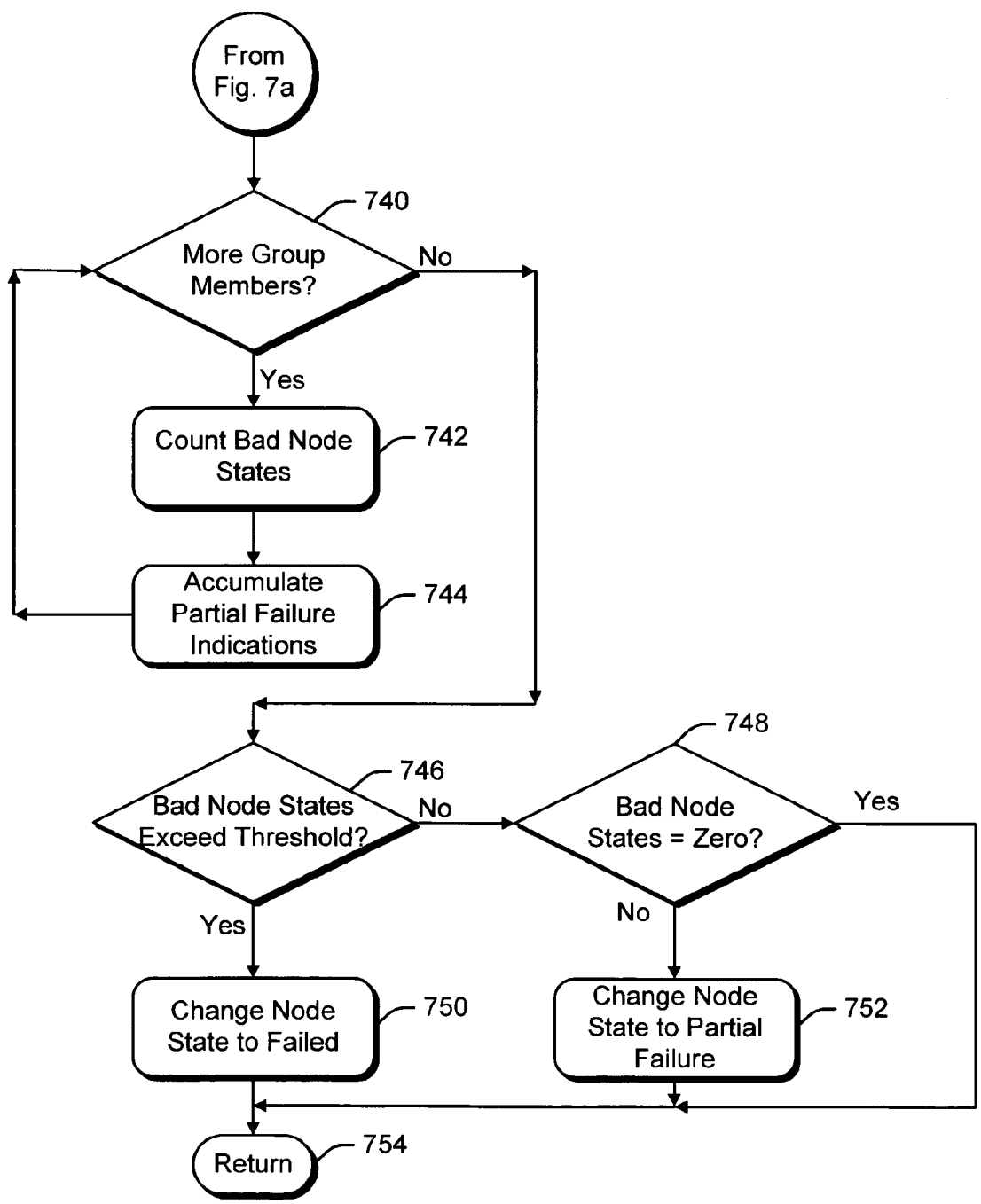
Figure 7C:
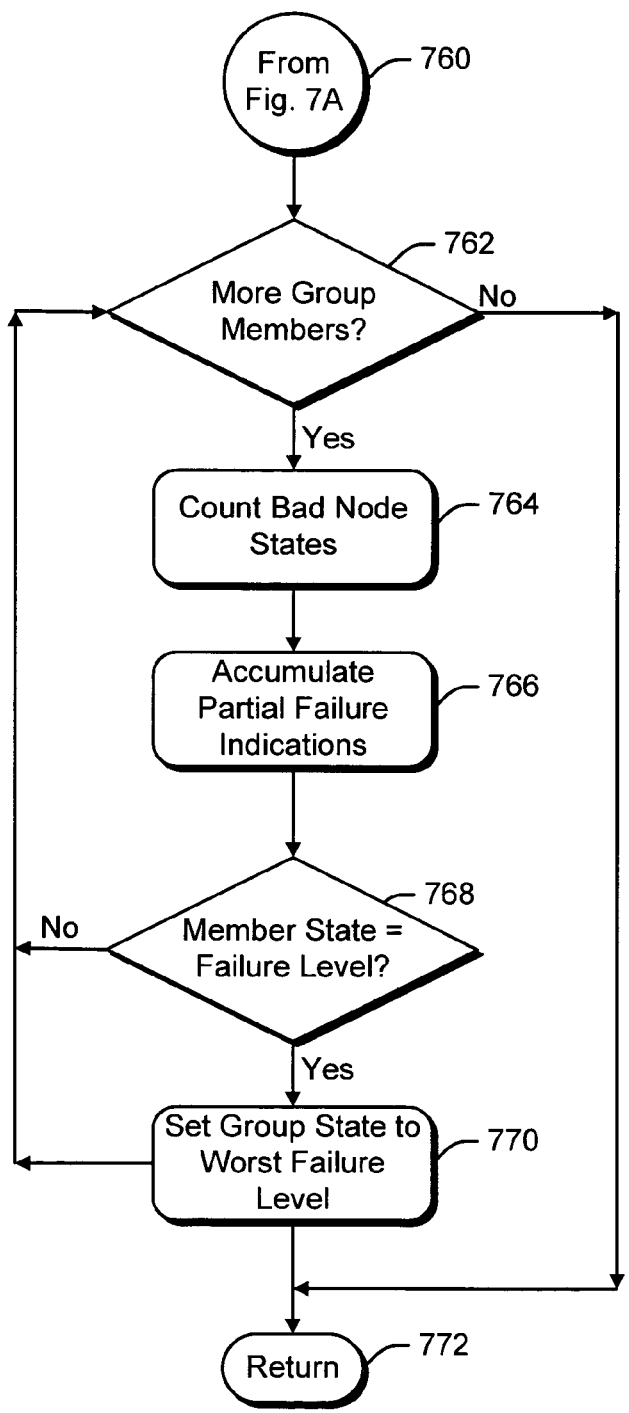

FIGS. 7A-7C are flowcharts illustrating operations in an exemplary process for recalculating the state of one or more nodes in a fault tolerance system. The operations of FIGS. 7A-7C are invoked, e.g., at operations 564 and 574. Referring to FIG. 7A, at operation 710 a node state change event is received. In an exemplary implementation the fault tolerance logic engine 340 generates a node state change event (e.g., at operations 564 and 574) when the process for recalculating the state of one or more nodes in the fault tolerance system is invoked. The node state change event enumerates a specific node.

If, at operation 712, the specific node is a component node, then control passes to operation 714 and the fault tolerance logic engine 340 generates an event for the event generation registry 330. This process is described in detail below, with reference to FIG. 8. Operations 716-718 represent a recursive invocation of the state change process. If, at operation 716 the specific nodes has one or more dependent nodes, then at operation 718 the state of the dependent nodes are recalculated. The operations 716-718 are repeated until all nodes dependent on the specific node are processed. This may involve processing multiple layers of nodes in a graph such as the graph illustrated in FIG. 4.

By contrast, if at operation 712 the specific node is not a component node (i.e., it is a redundancy node or a dependency node) then control passes to operation 722 and a node state accumulator is initialized. In an exemplary implementation a node state accumulator may be embodied as a numerical indicator of the number of bad node states in a redundancy node or a dependency node. In an alternate implementation a node state accumulator may be implemented as a Boolean state indicator.

If, at operation 724, the specific node is a redundancy node, then at operation 726 control passes to the operations of FIG. 7B. Referring to FIG. 7B, in a loop represented by operations 740-744 the bad node states in the redundancy group are counted and node state accumulator is updated to reflect the number of bad node states. Thus, if at operation 740 there are more nodes in the group to process then control passes to operation 742 and the number of bad node states is counted and at operation 744 the number of partial failure indications is accumulated in the node state accumulator.

When all the members of the redundancy group have been processed, then control passes from operation 740 to operation 746 and the number of bad node states is compared to a redundancy level threshold. If the number of bad node states exceeds the redundancy level threshold, then the node state is changed to "failed" at operation 750, and control returns to the calling routine at operation 754. By contrast, if the number of bad node states remains below the redundancy level threshold, then control passes to operation 748. If, at operation 748 the number of bad node states is zero, then control returns to the calling routine at operation 754. By contrast, if the number of bad node states is not zero, then control passes to operation 752 and the node state is changed to reflect a partial failure.

In an exemplary implementation the redundancy level may be implemented as a threshold that represents the maximum number of bad node states allowable in a redundancy node before the state of the redundancy node changes from active to inactive (or failed). The threshold may be set, e.g., by a manufacturer of a device or by a system administrator as part of configuring a system. By way of example, a redundancy group that represents a disk array having eight disks that is configured to implement RAID 5 storage may be further configured to change its state from active to failed if three or more disks become inactive.

Referring back to FIG. 7A, if at operation 724 the node is not a redundancy node (i.e., if it is a dependency node) then control passes to the operations of FIG. 7C. Referring to FIG. 7C, in a loop represented by operations 762-770 the bad node states in member nodes of the dependency group are counted (operation 764) and node state accumulator is updated (operation 766) to reflect the number of bad member node states. If at operation 768 a member node indicates a failure level (either full or partial failure), then control passes to operation 770 and the dependency group state is reset to the worst failure state of its constituent members. By way of example, if a dependency group includes several members having a partial failure state and other members having a complete failure state, then the dependency group is assigned a complete failure state. At operation 772, control is returned to the calling routine.

Figure 8:
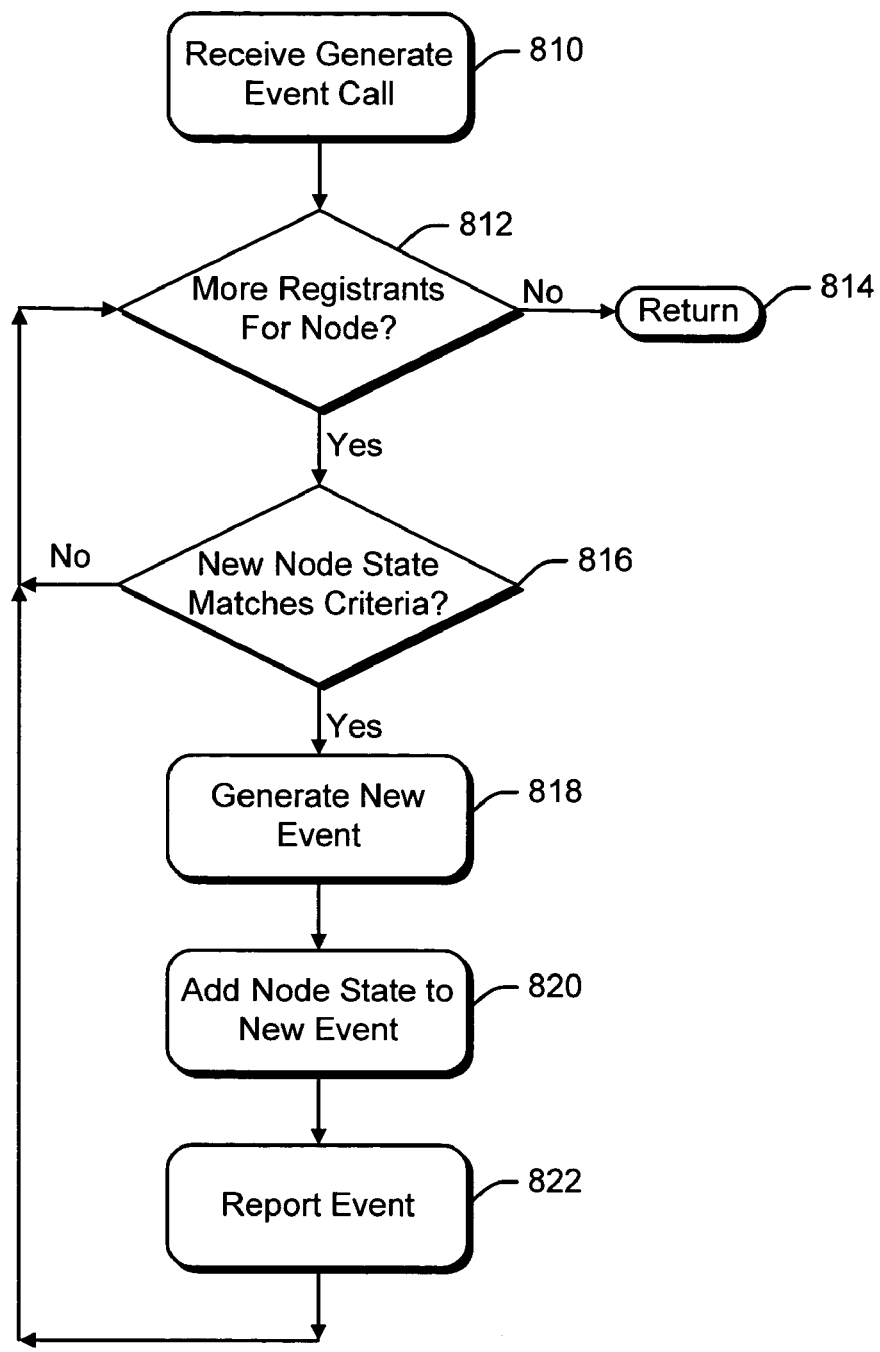
FIG. 8 is a flowchart that illustrates operations in an exemplary process for generating a new event.

FIG. 8 is a flowchart that illustrates operations in an exemplary process for generating a new event. At operation 810 a generate event call is received, e.g., as a result of operation 714 when a new node state is being calculated. In response to the event call, the fault tolerance logic engine 340 invokes a query to the event generation registry table 330 to determine if one or more components in the event generation registry table 330 is registered to receive a notice of the event. If, at operation 812, there are no more registrants for the node enumerated in the event, then the routine terminates at operation 814. By contrast, if at operation 812 there are more registrants for the node, then control passes to operation 816, where it is determined whether the new node state matches criteria specified in a the event generation registry table 330. As described above, the event generation registry table 330 contains entries from devices associated with the system that indicate when the devices want to receive event notices. For example, a device associated with the system may wish to receive an event notice in the event that a disk array fails.

If, at operation 816 the new node state matches criteria specified in the event generation registry table, then control passes to operation 818 and a new event is generated. At operation 820 the new node state is added to the new event, and at operation 822 the new event is reported to the device(s) that are registered to receive the event. In an exemplary implementation the event may be reported by transmitting an event message using conventional electronic message transmitting techniques.

Figure 9:
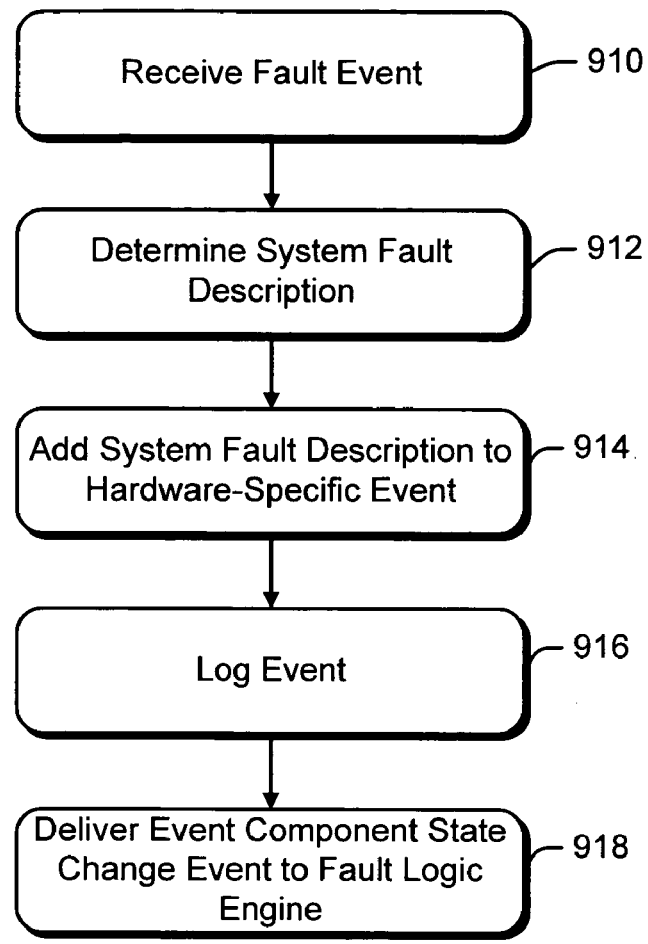
FIG. 9 is a flowchart illustrating operations of the fault tolerance logic engine in response to a fault event.

FIG. 9 is a flowchart illustrating operations of the fault tolerance logic engine in response to a fault event. In operation, after the system has configured a model of the fault tolerant system the fault tolerance logic engine 340 monitors the fault tolerant system for fault events. In an exemplary implementation fault events from the fault tolerant system are received by the fault normalizer 335, which consults the component classes table 310 and the fault symptom catalog table 320 to convert the fault events into a format acceptable for input to the fault tolerance logic engine.

At operation 910 a fault event is received in the fault normalizer 335. At operation 912 the fault normalizer 335 determines the system fault description, e.g., by looking up the system fault description in the fault symptom catalog table 320 based on the received hardware-specific event. At operation 914 the system fault description (e.g., a node handle for use in the fault tolerance logic engine 340 and a new node state) is associated with the hardware specific event. At operation 916 the event is logged, e.g., in a memory location associated with the system. And at operation 918 the event component state is delivered to the fault tolerance logic engine 340, which processes the event.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of monitoring a fault tolerant system, comprising:
    maintaining an abstract model of the fault tolerant system;
    monitoring operation of the fault tolerant system;
    applying fault events received from the fault tolerant system to the abstract model; and
    reporting one or more changes in the abstract model to a component in the fault tolerant system, wherein maintaining an abstract model of the fault tolerant system comprises:
        receiving a configuration event indicating the removal of at least one component to the fault tolerant system; and
        in response, removing at least one corresponding component from the abstract model; and
    wherein removing at least one corresponding component from the abstract model comprises:
        dissolving the logical association between the at least one corresponding component and one or more components dependent on the at least one corresponding component; and
        recalculating a state of the one or more components dependent on the at least one corresponding component.

2. The method of claim 1, wherein maintaining an abstract model of the fault tolerant system comprises: receiving a configuration event indicating the addition of at least one component to the fault tolerant system; and in response, adding at least one corresponding component to the abstract model.

3. The method of claim 2, further comprising representing redundancy relationships between the at least one corresponding component and one or more other components in the abstract model.

4. The method of claim 3, further comprising representing dependency relationships between the at least one corresponding component and one or more other components in the abstract model.

5. The method of claim 1, wherein removing at least one corresponding component from the abstract model comprises:
dissolving one or more logical associations between the at least one corresponding component and at least one additional component in the abstract model.

6. The method of claim 1, wherein maintaining an abstract model of the fault tolerant system comprises:
receiving a configuration event indicating an addition or a removal of at least one component to a logical group in the fault tolerant system; and
in response, updating the logical group to reflect the addition or removal of the at least one component; and
recalculating a state of a group of components dependent on the at least one component.

7. The method of claim 6, wherein recalculating a state of one or more components dependent on the at least one component comprises propagating a failure state associated with the at least one component to a group of components dependent on the at least one component.

8. The method of claim 7, further comprising:
maintaining a failure indicator that represents one or more failure parameters in the group of components dependent on the at least one component; and
setting a group state parameter to indicate a group failure if the failure indicator exceeds a threshold.

9. The method of claim 7, further comprising:
maintaining a failure indicator that represents one or more failure parameters in the group of components dependent on the at least one component; and
setting a group state parameter to indicate a group failure if any group state parameter indicates a failure.

10. The method of claim 1, wherein applying fault events received from the fault tolerant system to the abstract model comprises: receiving a state change event for one or more components in the fault tolerant system; updating the abstract model to propagate the state change event to a group of components dependent on the at least one component.

11. The method of claim 10, wherein updating the abstract model to propagate the state change event to a group of components dependent on the at least one component comprises:
maintaining a failure indicator that represents one or more failure parameters in the group of components dependent on the at least one component; and
setting a group state parameter to indicate a group failure if the failure indicator exceeds a threshold.

12. The method of claim 10, wherein updating the abstract model to propagate the state change event to a group of components dependent on the at least one component comprises:
maintaining a failure indicator that represents one or more failure parameters in the group of components dependent on the at least one component; and
setting a group state parameter to indicate a group failure if any group state parameter indicates a failure.

13. The method of claim 1, wherein reporting one or more changes in the abstract model to a component in the fault tolerant system comprises searching an event generation registry table for entries corresponding to a specific node in the abstract model.

14. The method of claim 1, wherein the means for generating one or more reporting events in response to changes in the availability of a component in the abstract model comprises logic instructions executable on a processor that search an event generation registry table for entries corresponding to a specific node in the abstract model.

15. A method of monitoring a fault tolerant system, comprising:
maintaining an abstract model of the fault tolerant system;
monitoring operation of the fault tolerant system; applying fault events received from the fault tolerant system to the abstract model; and
reporting one or more changes in the abstract model to a component in the fault tolerant system, wherein maintaining an abstract model of the fault tolerant system comprises:
receiving a configuration event indicating an addition or a removal of at least one component to a logical group in the fault tolerant system; and
in response, updating the logical group to reflect the addition or removal of the at least one component; and
recalculating a state of a group of components dependent on the at least one component, and wherein recalculating a state of one or more components dependent on the at least one component comprises propagating a failure state associated with the at least one component to a group of components dependent on the at least one component;
maintaining a failure indicator that represents one or more failure parameters in the group of components dependent on the at least one component; and
setting a group state parameter to indicate a group failure if the failure indicator exceeds a threshold.

16. The method of claim 15, wherein maintaining an abstract model of the fault tolerant system comprises:
receiving a configuration event indicating the addition of at least one component to the fault tolerant system; and
in response, adding at least one corresponding component to the abstract model.

17. The method of claim 16, further comprising representing redundancy relationships between the at least one corresponding component and one or more other components in the abstract model.

18. The method of claim 17, further comprising representing dependency relationships between the at least one corresponding component and one or more other components in the abstract model.

19. The method of claim 15, wherein maintaining an abstract model of the fault tolerant system comprises: receiving a configuration event indicating the removal of at least one component to the fault tolerant system; and in response, removing at least one corresponding component from the abstract model.

20. The method of claim 19, wherein removing at least one corresponding component from the abstract model comprises:
dissolving the logical association between the at least one corresponding component and one or more components dependent on the at least one corresponding component; and
recalculating a state of the one or more components dependent on the at least one corresponding component.

21. The method of claim 19, wherein removing at least one corresponding component from the abstract model comprises:
dissolving one or more logical associations between the at least one corresponding component and at least one additional component in the abstract model.

22. The method of claim 15, further comprising:
maintaining a failure indicator that represents one or more failure parameters in the group of components dependent on the at least one component; and setting a group state parameter to indicate a group failure if any group state parameter indicates a failure.

23. The method of claim 15, wherein applying fault events received from the fault tolerant system to the abstract model comprises:

receiving a state change event for one or more components in the fault tolerant system;

updating the abstract model to propagate the state change event to a group of components dependent on the at least one component.

24. The method of claim 23, wherein updating the abstract model to propagate the state change event to a group of components dependent on the at least one component comprises:

maintaining a failure indicator that represents one or more failure parameters in the group of components dependent on the at least one component; and setting a group state parameter to indicate a group failure if the failure indicator exceeds a threshold.

25. The method of claim 23, wherein updating the abstract model to propagate the state change event to a group of components dependent on the at least one component comprises:

maintaining a failure indicator that represents one or more failure parameters in the group of components dependent on the at least one component; and setting a group state parameter to indicate a group failure if any group state parameter indicates a failure.

26. The method of claim 15, wherein reporting one or more changes in the abstract model to a component in the fault tolerant system comprises searching an event generation registry table for entries corresponding to a specific node in the abstract model.

* * * * *